United States Patent
Dix et al.

(10) Patent No.: US 11,623,607 B1
(45) Date of Patent: Apr. 11, 2023

(54) VEHICLE SEAT ASSEMBLY

(71) Applicant: NISSAN NORTH AMERICA, INC., Franklin, TN (US)

(72) Inventors: Jeffery Dix, Farmington Hills, MI (US); Matthew Gapinski, Spring Hill, TN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/683,281

(22) Filed: Feb. 28, 2022

(51) Int. Cl.
| B60R 22/06 | (2006.01) |
| B60R 22/26 | (2006.01) |
| B60R 22/28 | (2006.01) |
| B60R 22/18 | (2006.01) |

(52) U.S. Cl.
CPC .............. B60R 22/06 (2013.01); B60R 22/26 (2013.01); B60R 22/28 (2013.01); *B60R 2022/1806* (2013.01); *B60R 2022/1812* (2013.01); *B60R 2022/288* (2013.01)

(58) Field of Classification Search
CPC ... B60R 2022/281; B60R 22/28; B60R 22/26; B60R 22/06
USPC .......................................................... 280/805
See application file for complete search history.

(56) References Cited

U.S. PATENT DOCUMENTS

| 2,680,476 | A | * | 6/1954 | Saffell | ...................... | B60R 22/28 244/122 B |
| 3,744,814 | A | * | 7/1973 | Sturman | ................. | B60R 22/48 280/805 |
| 4,201,418 | A | * | 5/1980 | Reidelbach | ......... | B60R 22/1958 280/805 |
| 4,317,584 | A | * | 3/1982 | Takata | .................... | B60R 22/06 297/469 |
| 5,022,677 | A | * | 6/1991 | Barbiero | ................. | B60R 22/06 297/483 |
| 5,037,132 | A | * | 8/1991 | Borlinghaus | ........... | B60R 22/18 188/282.1 |
| 5,823,627 | A | * | 10/1998 | Viano | ..................... | B60N 2/688 297/483 |
| 5,971,489 | A | * | 10/1999 | Smithson | ............ | B60R 22/3413 188/374 |
| 6,102,439 | A | * | 8/2000 | Smithson | ................ | B60R 22/28 280/805 |

(Continued)

FOREIGN PATENT DOCUMENTS

| FR | 2695603 A1 * | 3/1994 | ............. B60R 22/28 |
| FR | 2886249 A1 * | 12/2006 | ............. B60R 22/03 |

OTHER PUBLICATIONS

FR2695603A1 translation from espacenet.com August (Year: 2022).*

*Primary Examiner* — Paul N Dickson
*Assistant Examiner* — Maxwell L Meshaka
(74) *Attorney, Agent, or Firm* — Global IP Counselors, LLP (57) ABSTRACT

A vehicle seat assembly for a vehicle includes a vehicle seat, a seat support rail, a load limiter and a seatbelt assembly. The seat support rail supports the vehicle seat within the vehicle. The vehicle seat is adjustably supported to the seat support rail. The load limiter is supported to the seat support rail. The seatbelt assembly has a latch and a receptacle that receives the latch. The receptacle is movably supported to the load limiter. The receptacle is movable along the load limiter from a rest position to an operated position upon receiving a predetermined force.

8 Claims, 5 Drawing Sheets

(56) References Cited

U.S. PATENT DOCUMENTS

| | | | |
|---|---|---|---|
| 6,419,271 B1 * | 7/2002 | Yamada | B60R 22/1952 |
| | | | 280/801.1 |
| 7,584,997 B2 * | 9/2009 | Bachmann | B60R 22/1958 |
| | | | 297/480 |
| 8,550,499 B2 * | 10/2013 | Russell | B60R 22/1955 |
| | | | 280/806 |
| 10,081,330 B2 * | 9/2018 | Arnold | B60N 2/688 |
| 10,246,046 B2 | 4/2019 | Sharif | |
| 11,180,110 B2 * | 11/2021 | Jaradi | B60R 22/26 |
| 2015/0307060 A1 * | 10/2015 | Arnold | B60R 22/201 |
| | | | 297/469 |
| 2018/0354453 A1 * | 12/2018 | Sharif | B60R 22/28 |

* cited by examiner

VEHICLE SEAT ASSEMBLY

BACKGROUND

Field of the Invention

The present invention generally relates to a vehicle seat assembly. More specifically, the present invention relates to a vehicle seat assembly having a load limiter.

Background Information

When a vehicle in motion undergoes rapid and/or sudden deceleration, a passenger within the vehicle responds in accordance with Newton's laws of motion such that momentum of the passenger imparts forces to a seatbelt restraining the passenger thereby transferring force to the seatbelt. The transferred force puts the seatbelt under tension.

SUMMARY

In view of the state of the known technology, one aspect of the present disclosure is to provide a vehicle seat assembly for a vehicle comprising a vehicle seat, a seat support rail, a load limiter and a seatbelt assembly. The seat support rail supports the vehicle seat within the vehicle. The vehicle seat is supported to the seat support rail. The load limiter is supported to the seat support rail. The seatbelt assembly has a latch and a receptacle that receives the latch. The receptacle is movably supported to the load limiter. The receptacle is movable along the load limiter from a rest position to an operated position upon receiving a predetermined force.

In view of the state of the known technology, one aspect of the present disclosure is to provide a vehicle seat assembly comprising a vehicle seat and a seatbelt assembly. The seatbelt assembly has a receptacle that is movable with respect to the vehicle seat from a rest position to an operated position upon receiving a predetermined force. The rest position being closer to a vehicle front end than the rest position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
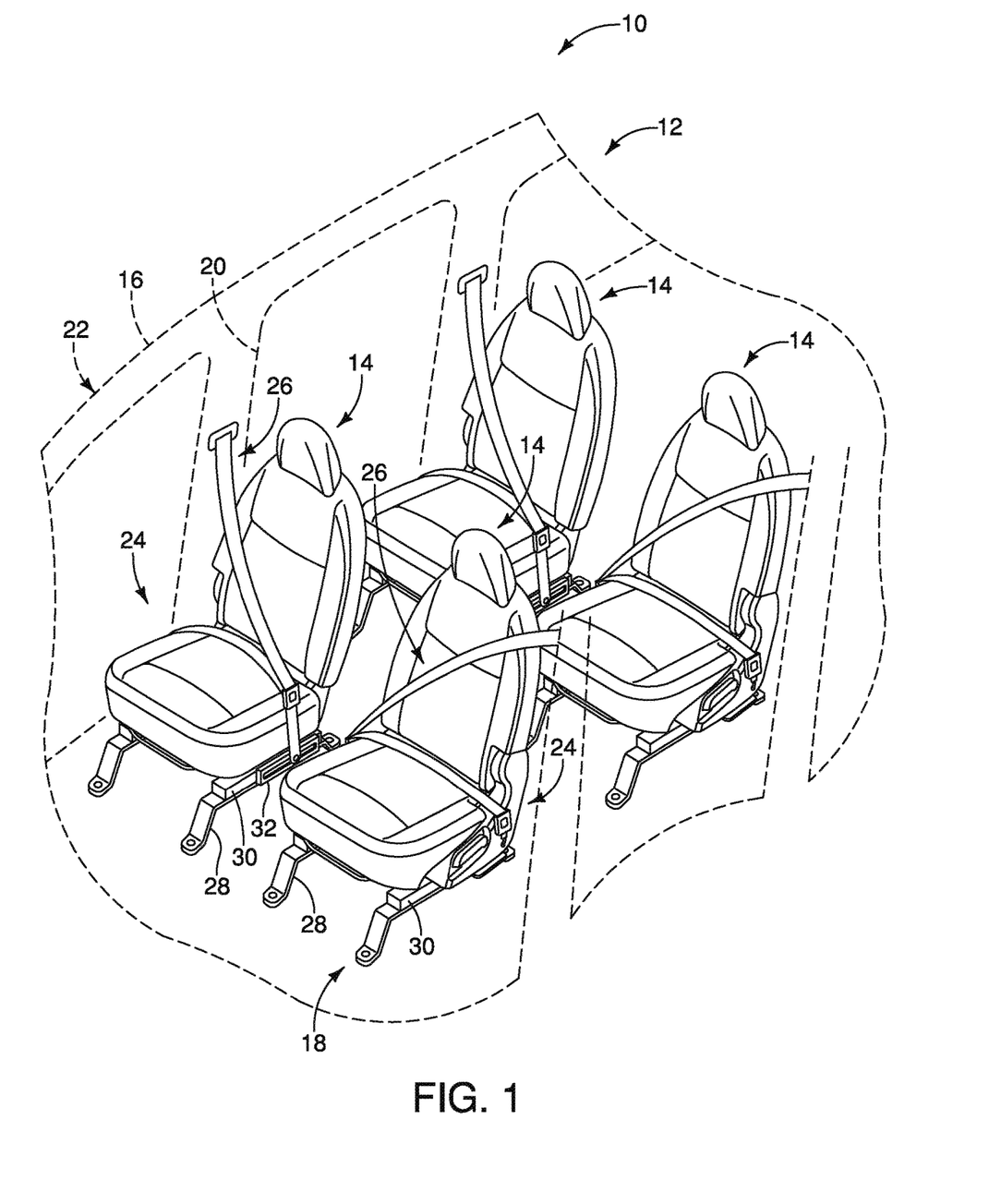
FIG. 1 is a perspective view of a passenger compartment of a vehicle equipped with a plurality of vehicle seat assemblies in accordance with an illustrated embodiment.
Figure 2:
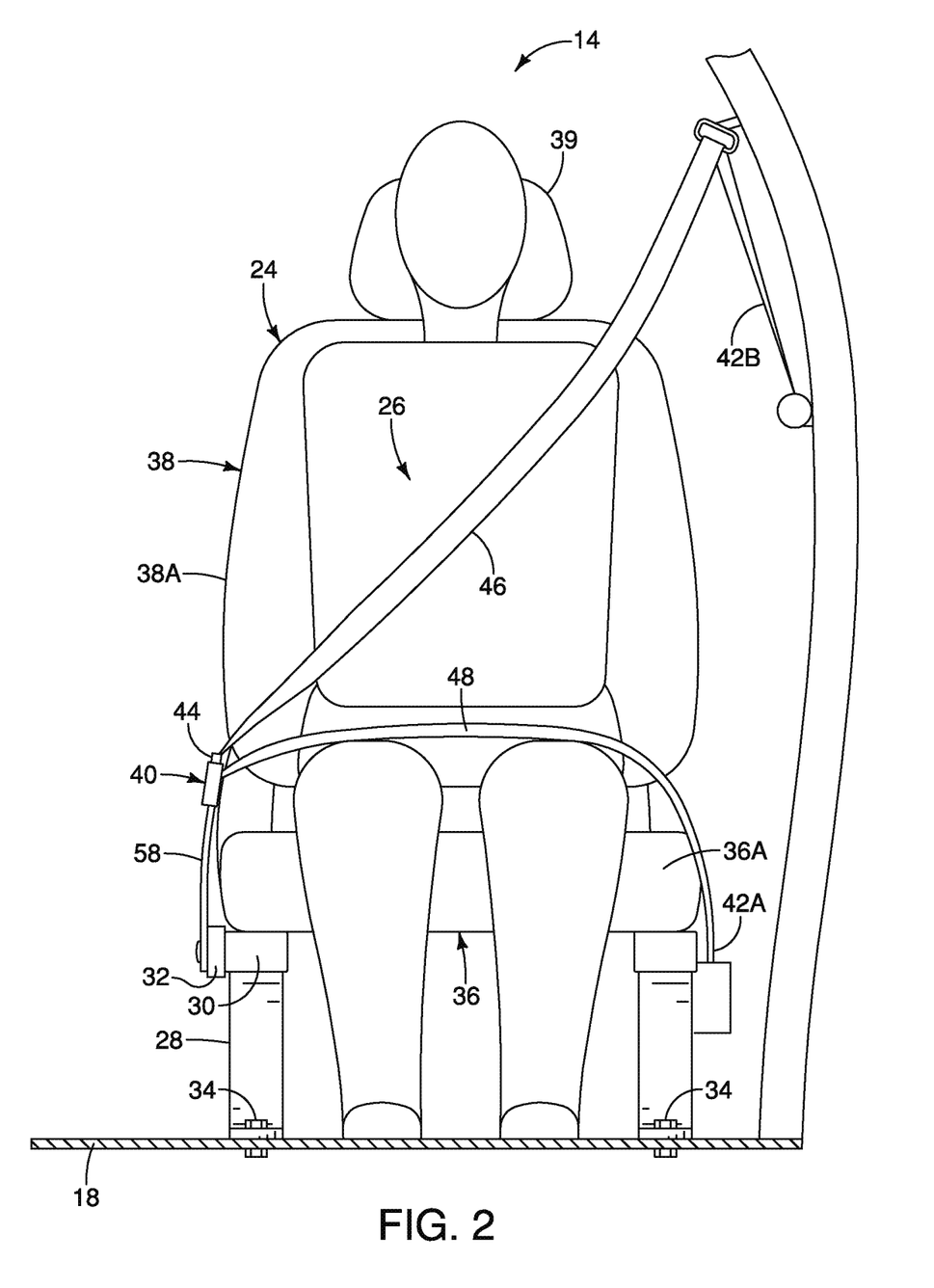
FIG. 2 is a front view of one of the vehicle seat assemblies depicted in FIG. 1 having a seatbelt assembly with a load limiter.

Referring initially to FIGS. 1 and 2, a vehicle 10 having a vehicle passenger compartment 12 is illustrated. The vehicle passenger compartment 12 is equipped with a plurality of seat assemblies 14 in accordance with an illustrated embodiment. The vehicle 10 includes a vehicle body structure 16 that defines the passenger compartment 12. The vehicle body structure 16 includes, among other features, a floor 18, one or more pillar structures 20 and a roof structure 22 that together define the passenger compartment 12.

Each of the vehicle seat assemblies 14 is equipped with a vehicle seat 24 and a corresponding seatbelt assembly 26. Thus, the vehicle includes a plurality of vehicle seats 24 and a plurality of seatbelt assemblies 26. Therefore, the vehicle seat 24 and the seatbelt assembly 26 together are part of the vehicle seat assembly 14. Since each of the seatbelt assemblies 26 is basically identical except for their position and orientation within the passenger compartment 12, only one seatbelt assembly 26 will be further described for the sake of brevity. Also, as the vehicle seats 24 are basically identical except for their location and orientation within the passenger compartment 12, only the vehicle seat 24 that is equipped the seatbelt assembly 26 will be further described herein for brevity.

Thus, the vehicle seat assembly 14 of the illustrated embodiment comprises the vehicle seat 24 and the seatbelt assembly 26, as shown in FIG. 2. Preferably, the vehicle seat assembly 14 further comprising a seat support structure 28 and a seat support rail 30. The vehicle seat assembly 14 of the illustrated embodiment preferably further comprises a load limiter 32, as will be further described below.

Figure 3:
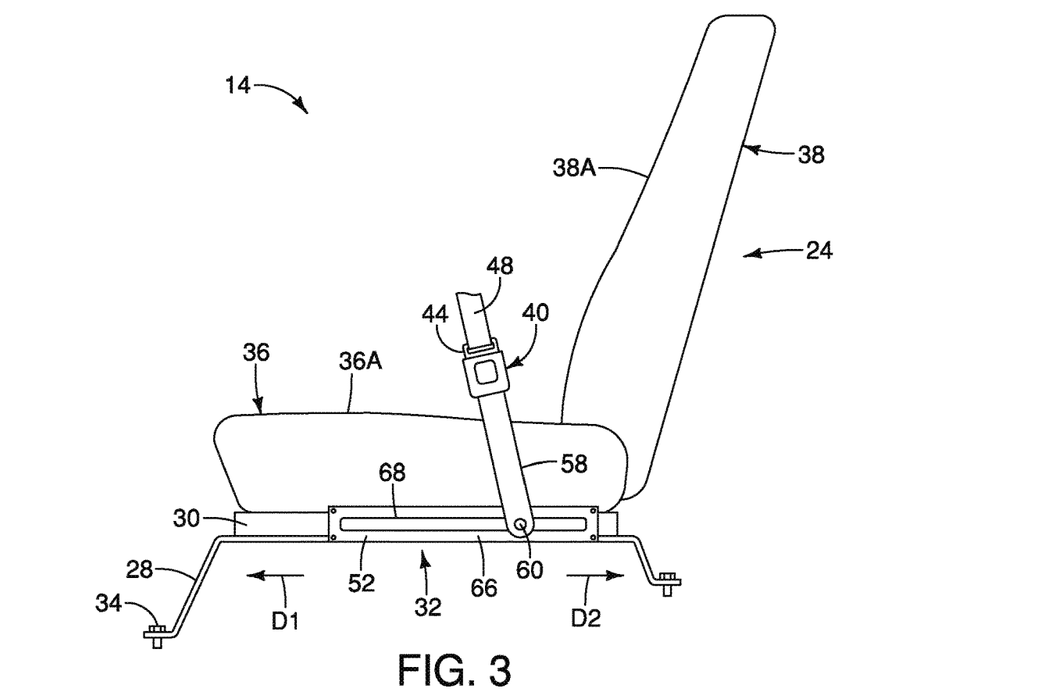
FIG. 3 is a side view of the vehicle seat assembly of FIG. 2 showing the seatbelt assembly with the load limiter in a rest position example.
Figure 4:
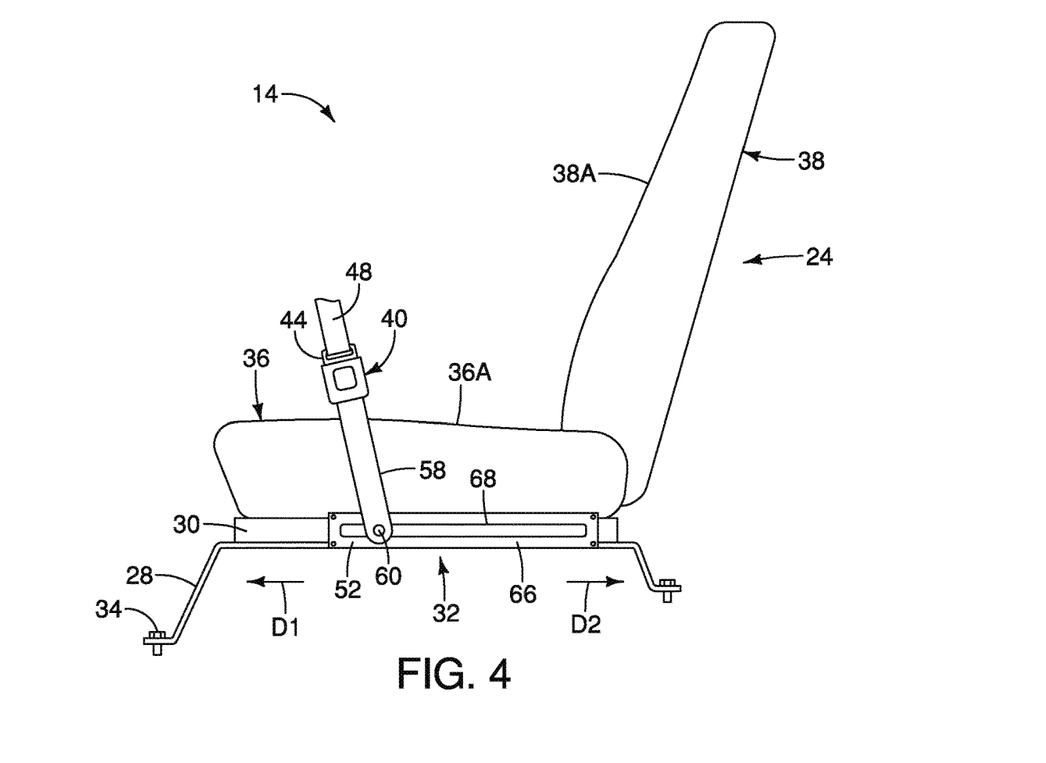
FIG. 4 is a side view of the vehicle seat assembly of FIG. 3 showing the seatbelt assembly with the load limiter in an operated position example.
Figure 5:
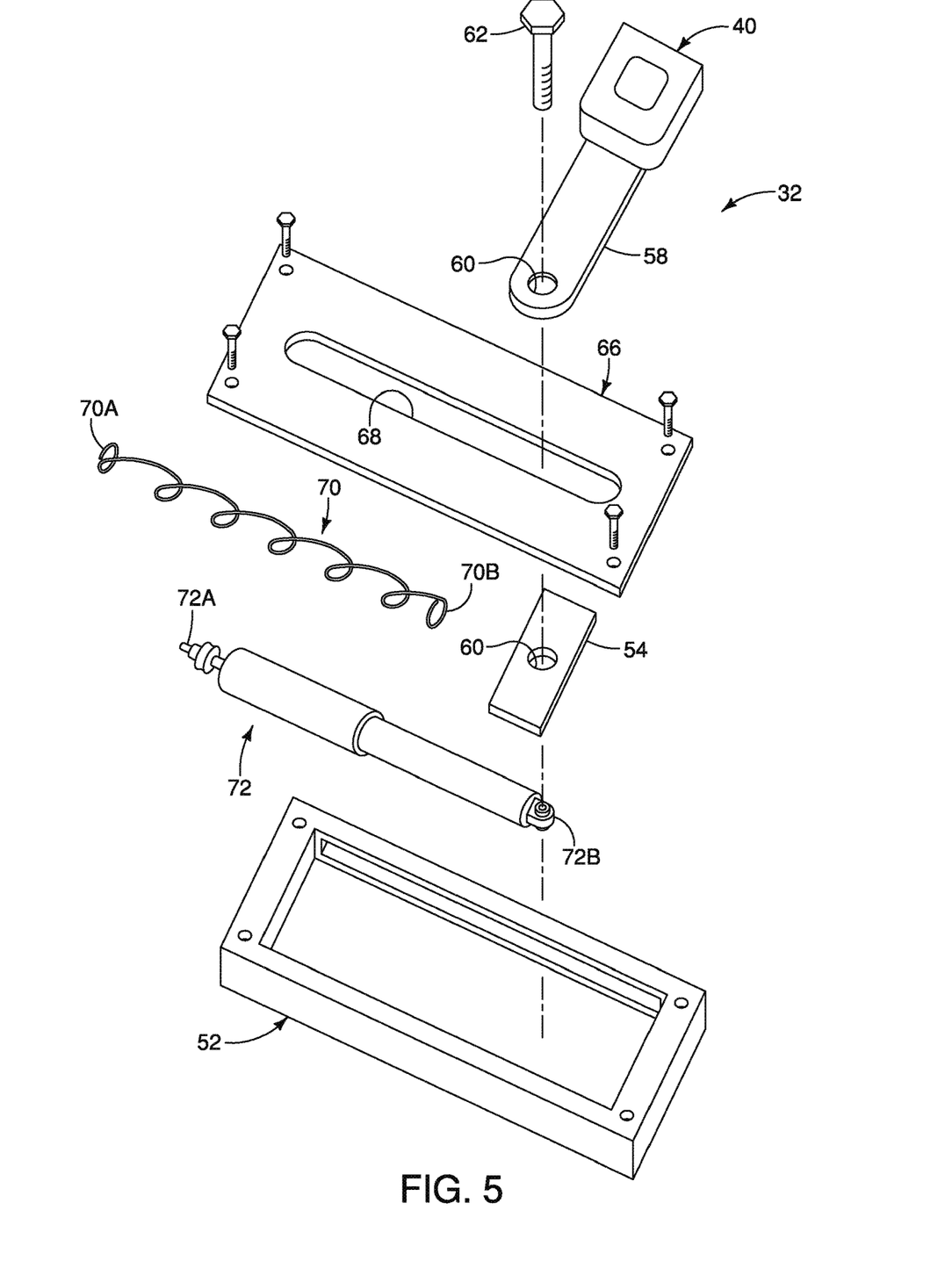
FIG. 5 is an exploded view of the load limiter.

As shown in FIGS. 2 to 4, the seat support structure 28 is considered a bracket or a rail that is stationary with respect to the vehicle floor 18. For example, the seat support structure 28 can be fixed directly or indirectly onto the vehicle floor 18 by one or more fasteners, such as bolts. The vehicle seat 24 is supported to the seat support structure 28 either directly or indirectly. Therefore, the seat support structure 28 maintains the vehicle seat 24 within the passenger compartment 12.

The vehicle seat 24 is defined by a seat bottom 36 and a seat back 38 that are supported to the seat support structure 28. The seat bottom 36 includes a bottom cushion 36A and the seat back 38 includes a back cushion 38A. The vehicle seat 24 can further include a headrest 39 that is adjustably mounted to the seat back 38. The seat back 38 is pivotally adjustable with respect to the seat bottom 36 in a conventional manner by a lever and/or a button having a return spring (not shown). In the illustrated embodiment, the vehicle seat 24 is supported to the seat support structure 28 by the seat support rail 30.

That is, the seat support rail 30 supports the vehicle seat 24 to the seat support structure 28. As shown, the seat support rail 30 is adjustably supported to a track on seat support structure 28 allowing the vehicle seat 24 and the seat support rail 30 move in the forward and rearward directions D1 and D2 inside the passenger compartment 12. In the illustrated embodiment, the passenger can adjust the vehicle seat 24 position by adjusting seat support rail 30 with a lever or a button (not shown) along a track on seat support structure 28 to move the vehicle seat 24 with respect to the seat support structure 28. This arrangement allows the load limiter 32 to move with the seat and the passenger as the passenger adjusts the vehicle seat 24 in the forward and rearward directions D1 and D2.

The seatbelt assembly 26 further includes a receptacle 40, one or more seatbelt straps 42 and a latch tongue 44. The latch tongue 44 is configured to be releasably coupled to the receptacle 40 (e.g., a buckle) in a conventional manner. The receptacle 40 of the illustrated embodiment includes a conventional latch device for connection to the latch tongue 44. Since seatbelt latch devices in receptacle 40 mechanisms are conventional structures and mechanisms, further description is omitted for the sake of brevity.

As shown in FIG. 2, the seatbelt strap 42 comprises of one or more fabric straps preferably made of a durable fabric material, such as nylon. The seatbelt strap 42 has a first end 42A non-movably fixed relative to a portion of the seat structure or to the floor 18, and a second end 42B retractably retained within the passenger compartment 12. For example, the second end 42B can retract into a retraction device that is fixed to an adjacent one of the pillar structure 20 in a conventional manner. The latch tongue 44 is installed to the seatbelt strap 42 for sliding movement along the seatbelt strap 42.

The latch tongue 44 further divides the seatbelt strap 42 into a shoulder portion 46 (e.g., a shoulder belt) and a lap portion 48 (e.g., a lap belt). The shoulder portion 46 and the lap portion 48 can be one continuous belt strap, or can be separate belt straps that are individually fastened with respect to the vehicle seat 24. While the shoulder portion 46 and the lap portion 48 are illustrated as being a single integral belt strap is equipped with the load limiter 32, it will be apparent to those skilled in the vehicle field from this disclosure that the load limiter 32 can be compatible with a seatbelt having the shoulder portion 46 and the lap portion 48 as separate belt straps.

As shown in FIG. 2, the shoulder portion 46 extends from the latch tongue 44 across the torso and shoulder of a passenger seated in the seat structure. The lap portion 48 extends from the latch tongue 44 across the hip and upper thigh area of the passenger. Since seatbelts, latch tongues and retraction devices are conventional features, further description is omitted for the sake of brevity.

The load limiter 32 of the illustrated embodiment is provided with the seatbelt assembly 26 to limit the amount of force applied to a passenger's pelvic area from the lap portion 48 of the seatbelt as a result of an impact to the vehicle 10. By limiting the forward movement of the pelvic area, the force experienced from impact to the passenger can be better distributed to the chest area where the force can be deflected to more areas.

Events that cause forward displacement of the receptacle 40 along the load limiter 32 can be any one of the following: a rapid deceleration of the vehicle body structure 16, a hard-braking event or an impact event. A rapid deceleration of the vehicle body structure 16 can occur when the vehicle 10 engages deep water (greater than two or three inches of water). The rapid deceleration can last for several seconds, or only an instant. A hard-braking event occurs when a vehicle 10 operator applies a hard braking force to the brake pedal (not shown) of the vehicle 10 for a prolonged period of time (more that 1-2 seconds). An impact event is an event where the vehicle 10 impacts another vehicle, or a fixed barrier.

In the illustrated embodiment, the term "forward movement" (e.g., forward direction D1) refers to a movement of the passenger in a direction towards the vehicle front end. This is because limiting the forward movement of the pelvic enables the passenger to maintain a more upright posture.

With conventional seatbelt assemblies 26 without a load limiter 32 for limiting forward displacement of the passenger's pelvic area, force from an external impact to the vehicle 10 can cause excursion of the passenger in too much of a forward and an upward direction (up from the vehicle seat 24). Excursion of the passenger in too much in the forward and upward direction can cause the latch tongue 44 to become unbuckled from the receptacle 40, as well as unwanted stress on the passenger torso.

Thus, the load limiter 32 of the illustrated embodiment is provided to prevent unbuckling of the seatbelt during an impact and unwanted stress on passenger torso. As shown, the load limiter 32 is provided on the seat support rail 30. The seatbelt receptacle 40 is coupled to the load limiter 32 in the illustrated embodiment. Therefore, the seatbelt receptacle 40 of the illustrated embodiment is coupled to the seat support rail 30 to move along the seat support rail 30 in the forward direction D1 via the load limiter 32. The load limiter 32 is configured to limit the distance that the passenger moves in the forward direction D1, as will be further discussed below.

Using the disclosed arrangement of the receptacle 40 coupled to the load limiter 32 and the seat support rail 30, the load limiter 32 allows for the receptacle 40 to move forward to some degree during impact. By allowing the receptacle 40 to move in the forward direction D1, the lap portion 48 cannot provide too much elastic give to the passenger at the pelvic area which causes too much forward displacement along with upward displacement of the passenger during impact. By limiting the movement of the pelvic area in the forward direction D1, the seatbelt assembly 26 of the illustrated embodiment provides more load distribution on the chest area.

Therefore, the receptacle 40 of the seatbelt assembly 26 is movable with respect to the vehicle seat 24 from a rest position (FIG. 3) to an operated position (FIG. 4) upon receiving a predetermined force from an impact to the vehicle 10. The operated position is closer to the vehicle front end than the rest position. The receptacle 40 moves in the forward direction D1 when moving from the rest position to the operated position. That is, the seatbelt receptacle 40 moves in the forward direction D1 along the seat support rail 30 to move from the rest position to the operated position. Thus, the receptacle 40 is movably supported to the load limiter 32. In other words, the receptacle 40 is positioned along the load limiter 32 at a position that is closer to the vehicle front end when in the operated position than when in the rest position.

In the illustrated embodiment, the operating position includes a plurality of operated positions along the load limiter 32. That is, the receptacle 40 can move to a range of positions along the load limiter 32 in the forward direction D1 from the rest position. Preferably, the receptacle 40 can displace in the forward direction D1 by a distance of approximately 25 to 150 millimeters along the load limiter 32. More preferably, the receptacle 40 can displace in the forward direction D1 by a distance of approximately 100 millimeters along the load limiter 32. Therefore, the load limiter 32 is dimensioned to allow for approximately 25 to 150 millimeters movement of the receptacle 40 along the load limiter 32.

In the illustrated embodiment, the rest position is a position disposed proximate to a rear end of the load limiter 32. The seatbelt assembly 26 is therefore preset with the receptacle 40 coupled to proximal or adjacent to a rear end portion 50 of the load limiter 32, as seen in FIG. 3. Preferably, the seatbelt assembly 26 is configured such that the receptacle 40 can move in the forward direction D1 towards any one of the operated positions by 2 to 7 kilonewtons force. More preferably, the receptacle 40 can move upon receipt of 5 kilonewtons of force to the load limiter 32.

While the seatbelt assembly 26 of the illustrated embodiment is shown as having the receptacle 40 that is a seatbelt buckle coupled to the load limiter 32, it will be apparent to those skilled in the vehicle field from this disclosure that the seatbelt assembly 26 can be modified to have a pretensioner receptacle 40 used in conjunction with the disclosed arrangement instead of the buckle. That is, instead of the seatbelt buckle, the seatbelt assembly 26 can have a pretensioner receptacle 40 coupled to the rail in a similar manner as disclosed. Thus, the receptacle 40 of the seatbelt assembly 26 at least includes the buckle. The receptacle 40 can alternatively include a pretensioner receptacle.

Figure 6:
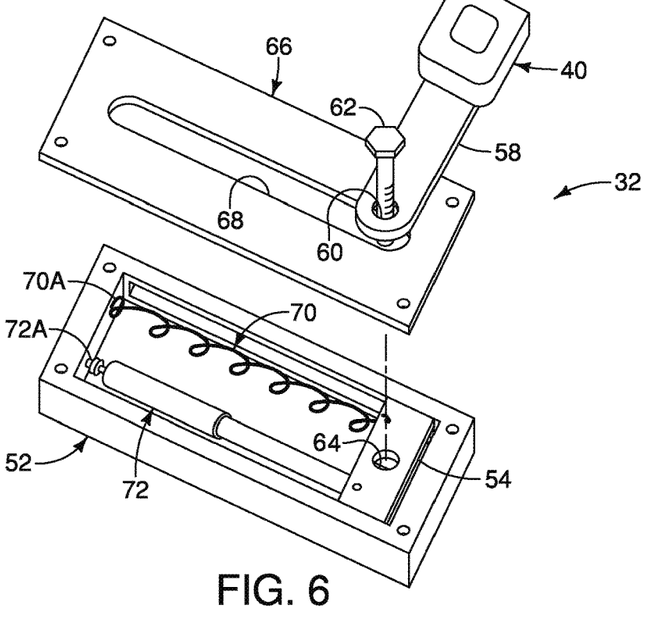
FIG. 6 is a partial exploded view of the load limiter of FIG. 5 with the receptacle of the seatbelt assembly in the rest position.
Figure 7:
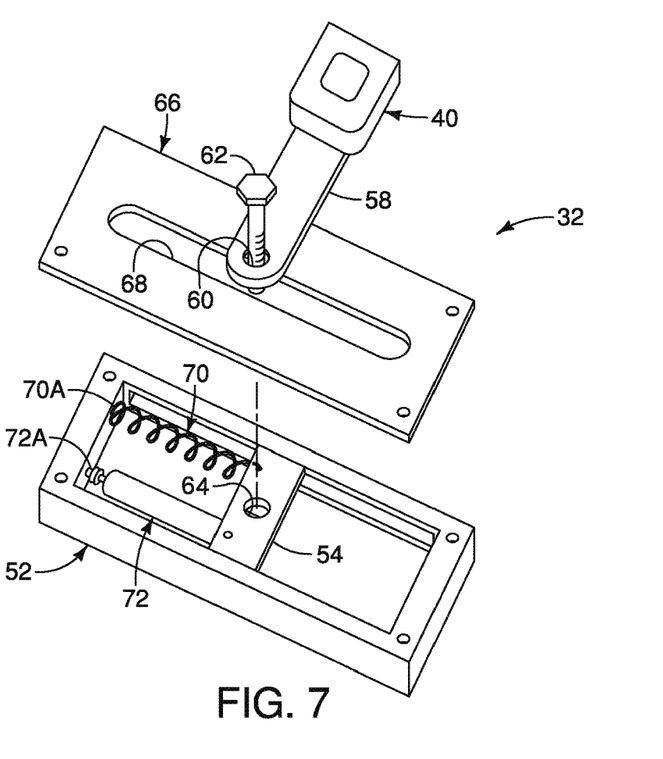
FIG. 7 is a partial exploded view of the load limiter similar to FIG. 6 with the receptacle of the seatbelt assembly in the operated position.

As stated, the load limiter 32 is supported to the seat support rail 30. As shown in FIGS. 3 and 4, the load limiter 32 is a track along which the receptacle 40 of the seatbelt moves. Referring to FIGS. 6 and 7, the load limiter 32 includes a housing 52 that is mounted to the seat support rail 30. The load limiter 32 further includes a movable member 54 movably disposed in the housing 52 to enable the receptacle 40 to move between the rest position and the operated position. Preferably, the movable member 54 is a rigid member such as a metallic plate. In particular, the movable member 54 preferably slides within the housing 52 of the load limiter 32. The housing 52 can have a pair of elongated recesses (one recess 56 shown) extending along the sidewalls of the housing 52 that receives the ends of the movable member 54 to enable the movable member 54 to slide within the recesses 56.

The receptacle 40 is mounted to the movable member 54 to move with the movable member 54 with respect to the housing 52 of the load limiter 32. As shown, the receptacle 40 preferably includes a connector 58 that is coupled to the movable member 54. For example, the receptacle 40 includes the connector 58 that is an extension and/or a tongue having a receiving opening 60 that receives a fastener 62 that attaches the receptacle 40 to the movable member 54. The fastener 62 can be a pivot pin or a bolt that extends through the receiving opening 60 to be received by a corresponding receiving opening 64 of the movable member 54.

The load limiter 32 further includes a cover having an elongated slot 68. The fastener extends through the elongated slot 68 to be coupled to the movable member 54. The movable member 54 has the corresponding receiving opening 64 that receives the fastener 62. The corresponding receiving opening 64 preferably has threads that mates with threads of the fastener 62. The elongated slot 68 of the cover defines a track length for the load limiter 32. The receptacle 40 moves along the elongated slot 68 between the rest position and the operated position.

The load limiter 32 further includes a biasing member 70 having a first end 70A that is operatively connected to the housing 52. The biasing member 70 further includes a second end 70B operatively connected to the movable member 54 to bias the movable member 54 into the rest position (e.g., in the rearward direction D2 in the passenger compartment 12). The biasing force of the biasing member 70 maintains he movable member 54 in the rest position. The impact to the load limiter forces the biasing member 70 to compress in order to move the movable member 54. The biasing member 70 can be a metallic coil spring, a pneumatic piston, or any of a variety of conventional devices that can be used to apply a biasing force in a manner that biases the movable member 54 towards the rear end of the housing 52. While only biasing member 70 is shown, it will be apparent to those skilled in the vehicle field from this disclosure that the load limiter 32 can include additional biasing members as needed and/or necessary.

The load limiter 32 further includes a dampener 72 having a first end 72A that is operatively connected to the housing 52. The dampener 72 further includes a second end 72B that is operatively connected to the movable member 54. The dampener 72 works with the biasing member 70 to maintain the movable member 54 in the rest position. The dampener 72 is a shock absorber that prevents rapid displacement of movable member 54 into the operated position when the passenger rapidly moves forward during impact. The dampener 72 preferably also slows the return movement of the movable member 54 back into the rest position. Therefore, the dampener 72 and the biasing member 70 maintains the movable member 54 into the rest position. The biasing member 70 are not under stress when the movable member 54 is in the rest position. The biasing member 70 and the dampener 72 are compressed when member 54 is in the operated position. The biasing member 70 can be tuned to allow movable member 54 to move when the predetermined force is applied (e.g., 2 to 7 kilonewtons force). The dampener 72 can also be a spring-based shock absorbers using coil springs or leaf springs, though torsion bars are used in torsional shocks as well. The dampener 72 can be any type of conventional shock absorber appropriate for dampening the return movement of the movable member 54 back into the rest position.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat assembly for a vehicle, comprising: a vehicle seat configured to be supported to a vehicle floor; a seat support rail movably supporting the vehicle seat to the vehicle floor such that the seat support rail is movable relative to the vehicle floor, the vehicle seat being supported to the seat support rail; a load limiter supported to the seat support rail; and a seatbelt assembly having a latch and a receptacle that receives the latch, the receptacle being movably supported to the load limiter, the receptacle being movable along the load limiter from a rest position to an operated position upon receiving a predetermined force, the load limiter further includes a biasing member having a first end operatively connected to the housing and a second end operatively connected to the movable member to bias the movable member into the rest position, the load limiter further includes a dampener, the dampener having a first end operatively connected to the housing and a second end operatively connected to the movable member to dampen the movement of the movable member back into the rest position by the biasing member, the dampener moving between an extended position and a compressed position as the receptacle of the seatbelt moves between the rest position and the operated position, the biasing member also being compressed when the dampener is in the compressed position, the biasing member being extended when the dampener is in the extended position.

2. The vehicle seat assembly according to claim 1, wherein
the receptacle is positioned along the load limiter closer to a vehicle front end when in the operated position than when in the rest position.

3. The vehicle seat assembly according to claim 2, wherein
the operating position includes a plurality of operated positions along the load limiter.

4. The vehicle seat assembly according to claim 3, wherein
the load limiter includes a housing that is mounted to the seat support rail, the load limiter further includes a movable member movably disposed in the housing along the rest position and the operated position.

5. The vehicle seat assembly according to claim 4, wherein
the receptacle is mounted to the movable member to move with the movable member with respect to the housing of the load limiter.

6. The vehicle seat assembly according to claim 1, wherein
the load limiter further includes a cover having an elongated slot, the elongated slot defining a track length for the load limiter, the receptacle moving along the elongated slot.

7. The vehicle seat assembly according to claim 6, wherein
the movable member is a plate.

8. The vehicle seat assembly according to claim 7, wherein
the movable member has a first attachment part that is attached to the biasing member,
the movable member has a second attachment part that is attached to the dampener.

\* \* \* \* \*